United States Patent
Ishii et al.

(10) Patent No.: US 7,907,291 B2
(45) Date of Patent: Mar. 15, 2011

(54) IMAGE SUPPLY DEVICE AND CONTROL METHOD OF THE SAME AND PRINTING SYSTEM

(75) Inventors: Hirokazu Ishii, Yokohama (JP); Masao Kato, Kawasaki (JP); Futoshi Sasaki, Kawasaki (JP); Nobuo Onuma, Yokohama (JP); Tomoyuki Watanabe, Komae (JP); Takuya Matsuno, Kawasaki (JP); Yoshiro Udagawa, Minamisaitama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 1203 days.

(21) Appl. No.: 11/221,518

(22) Filed: Sep. 8, 2005

(65) Prior Publication Data

US 2006/0055953 A1 Mar. 16, 2006

(30) Foreign Application Priority Data

Sep. 14, 2004 (JP) ................................. 2004-267513

(51) Int. Cl.
G06F 3/12 (2006.01)
H04N 5/225 (2006.01)
(52) U.S. Cl. .................................... 358/1.13; 348/207.2
(58) Field of Classification Search .................. 358/1.13, 358/1.9; 348/207.2
See application file for complete search history.

(56) References Cited

U.S. PATENT DOCUMENTS

| | | | | |
|---|---|---|---|---|
| 6,668,319 | B1 * | 12/2003 | Newell et al. | 713/100 |
| 7,123,367 | B1 * | 10/2006 | Kanaya et al. | 358/1.13 |
| 7,505,074 | B2 * | 3/2009 | Yoshino et al. | 348/333.11 |
| 2001/0013894 | A1 | 8/2001 | Parulski | |
| 2002/0080250 | A1 * | 6/2002 | Ogawa et al. | 348/232 |
| 2002/0130956 | A1 * | 9/2002 | Suzuki | 348/211 |
| 2004/0021902 | A1 | 2/2004 | Ogiwara et al. | |
| 2004/0252318 | A1 * | 12/2004 | Kuroda et al. | 358/1.12 |

FOREIGN PATENT DOCUMENTS

| | | |
|---|---|---|
| EP | 869656 A2 | 7/1998 |
| JP | 08-032911 A | 2/1996 |
| JP | 10-290470 A | 10/1998 |
| JP | 11-339026 A | 12/1999 |
| JP | 2000-165653 A | 6/2000 |
| JP | 2003-134457 A | 5/2003 |
| JP | 2004-129221 A | 4/2004 |

* cited by examiner

Primary Examiner — Benny Q Tieu
Assistant Examiner — Sunil Chacko
(74) Attorney, Agent, or Firm — Canon U.S.A., Inc. I.P. Division

(57) ABSTRACT

An image supply device and control method for supplying image data to a printing device by directly communicating with the printing device. The device and method include obtaining functional information of the printing device, obtaining printable range information indicating a printable range by the printing device, converting image data of a file to be printed in accordance with the printable range information and received printing specification information, and transmitting the converted image data to the printing device upon a data request from the printing device.

7 Claims, 16 Drawing Sheets

```
<?xml version="1.0"?>
<dps xmlns="http://xxxx/schema/">
  <output>
    <result>10000000</result>
      <getCapability>
        <capability>
          <paperSizes>  80010000  80010001  80010002
          </paperSizes>
        </capability>
      </getCapability>
  </output>
</dps>
```
701

FIG.11

| Vender NAME | ABC Company |
|---|---|
| MODEL | Model A |
| Version | 1.00 |
| . . . | . . . |

FIG.12

| PAPER SHEET SIZE | A4 |
|---|---|
| PAPER SHEET TYPE | PHOTOGRAPHIC PAPER |
| LAYOUT INFORMATION | 1-up |
| BORDERED/BORDERLESS | BORDERED |
| . . . | . . . |

FIG.13

| MODEL | Version | 1.00 | 1.01 | 1.02 |
|---|---|---|---|---|
| A | VERTICAL | 4800 | 4800 | 6400 |
| A | HORIZONTAL | 6400 | 6400 | 6400 |
| B | VERTICAL | 6400 | 6400 | 6400 |
| B | HORIZONTAL | 6400 | 6400 | 6400 |

FIG.14A

| PAPER SHEET TYPE | LAYOUT | PAPER SHEET SIZE | | |
|---|---|---|---|---|
| | | A4 | L SIZE | · · · · |
| PHOTOGRAPHIC PAPER | 1-up-BORDERED | 4800×6600 | 2200×3000 | · · · · |
| | 1-up-BORDERLESS | 5000×7000 | 2300×3200 | · · · · |
| | 2-up-BORDERED | 2200×3000 | 1000×1400 | · · · · |
| | 2-up-BORDERLESS | 2500×3500 | 1150×1600 | · · · · |
| | · · · · | · · · · | · · · · | · · · · |
| PLAIN PAPER | 1-up-BORDERED | 2400×3300 | 1100×1500 | · · · · |
| | 1-up-BORDERLESS | 2500×3500 | 1150×1600 | · · · · |
| | · · · · | · · · · | · · · · | · · · · |

FIG.14B

| PAPER SHEET TYPE | LAYOUT | PAPER SHEET SIZE | | |
|---|---|---|---|---|
| | | A4 | L SIZE | · · · · |
| PHOTOGRAPHIC PAPER | 1-up-BORDERED | 4800×6600 | 2200×3000 | · · · · |
| | 1-up-BORDERLESS | 5000×7000 | 2300×3200 | · · · · |
| | 2-up-BORDERED | 2200×3000 | 1000×1400 | · · · · |
| | 2-up-BORDERLESS | 2500×3500 | 1150×1600 | · · · · |
| | · · · · | · · · · | · · · · | · · · · |
| PLAIN PAPER | 1-up-BORDERED | 4800×6600 | 2200×3000 | · · · · |
| | 1-up-BORDERLESS | 5000×7000 | 2300×3200 | · · · · |
| | · · · · | · · · · | · · · · | · · · · |

FIG.16A

Portrait: VERTICALLY LONG RECTANGLE
Landscape: HORIZONTALLY LONG RECTANGLE

| PAPER SHEET SIZE / LAYOUT | A4 | 2L | L | POST CARD | BUSINESS CARD |
|---|---|---|---|---|---|
| 1UP | Portrait | Portrait | Portrait | Portrait | Portrait |
| 2UP | Landscape | Landscape | Landscape | Landscape | Landscape |
| 4UP | Portrait | Portrait | Portrait | Portrait | Portrait |
| 9UP | Portrait | Portrait | Portrait | Portrait | Portrait |
| 16UP | Portrait | Portrait | Portrait | Portrait | Portrait |

FIG.16B

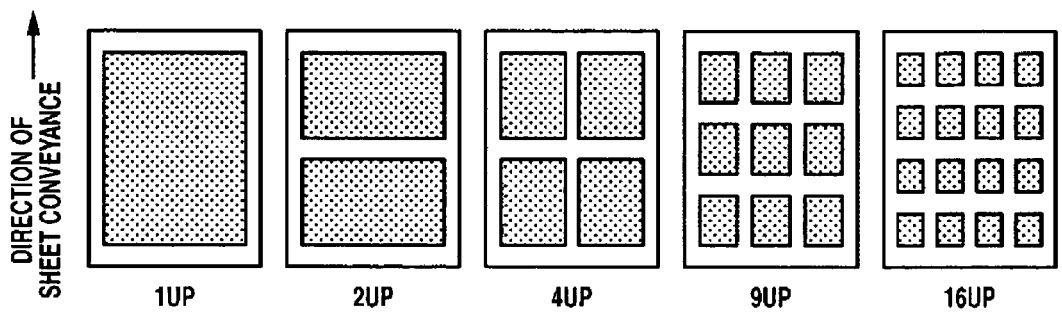

1UP    2UP    4UP    9UP    16UP

DIRECTION OF SHEET CONVEYANCE ↑

FIG.16C

| PAPER SHEET SIZE / LAYOUT | A4 | 2L | L | POST CARD | BUSINESS CARD |
|---|---|---|---|---|---|
| 1UP | Landscape | Landscape | Landscape | Landscape | Landscape |
| 2UP | Portrait | Portrait | Portrait | Portrait | Portrait |
| 4UP | Landscape | Landscape | Landscape | Landscape | Landscape |
| 9UP | Landscape | Landscape | Landscape | Landscape | Landscape |
| 16UP | Landscape | Landscape | Landscape | Landscape | Landscape |

FIG.16D

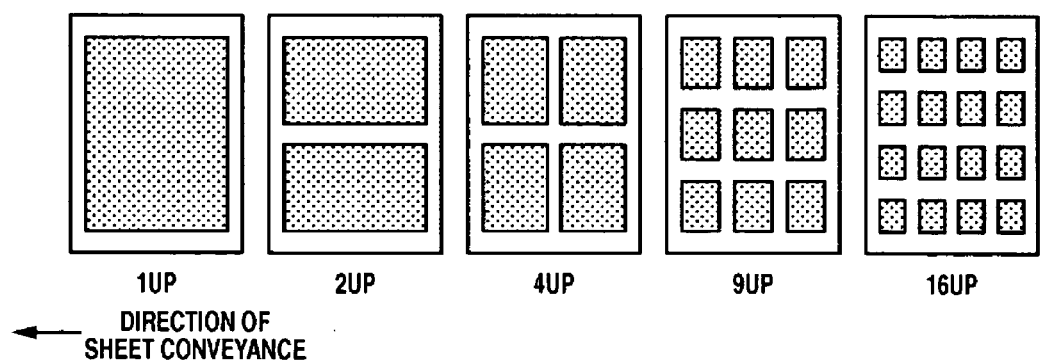

1UP    2UP    4UP    9UP    16UP

← DIRECTION OF SHEET CONVEYANCE

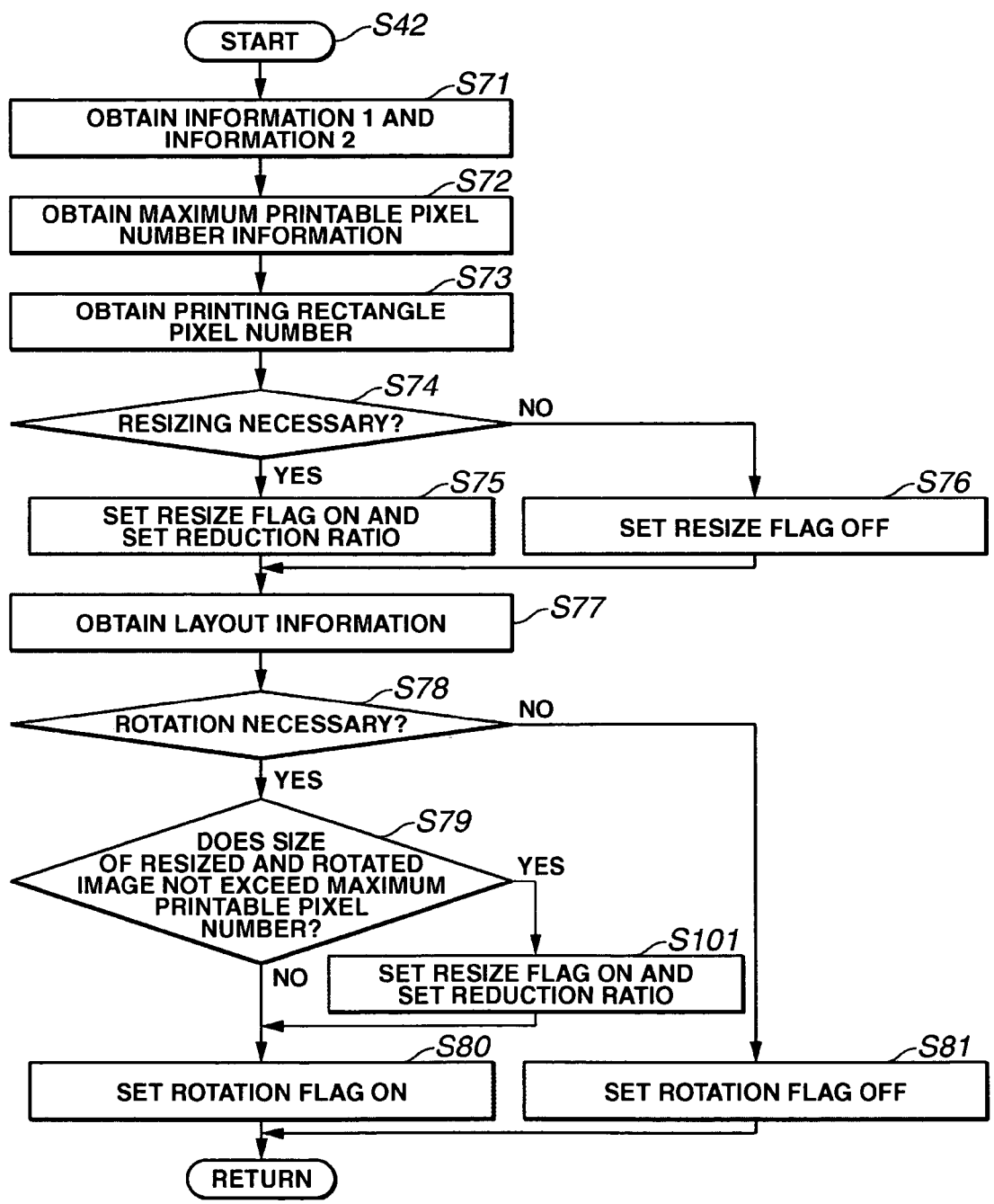

IMAGE SUPPLY DEVICE AND CONTROL METHOD OF THE SAME AND PRINTING SYSTEM

BACKGROUND OF THE INVENTION

1. Field of the Invention

The present invention relates to a printing system having an image supply device and a printing device, which carries out printing of an image by means of the printing device on the basis of image data supplied from the image supply device, and the image supply device, and a control method for controlling the device.

2. Description of the Related Art

In recent years, a so-called digital camera direct print system, in which a printer and a digital still camera (hereinafter referred to as a DSC) are directly connected to each other via an interface such as USB, and a photographic image stored in a storage medium (a memory card) of the DSC is transmitted to the printer so as to be printed, has become common and general on the market.

In the print system like this, generally, printing is carried out by transmitting a JPEG file intended for printing from the DSC to the printer and by performing decompression, color conversion, resizing, and the like on the printer side to convert the file into a printable data format.

On the other hand, in Japanese Laid-Open Patent Publication No. 8-32911, Japanese Laid-Open Patent Publication No. 10-290470, and Japanese Laid-Open Patent Publication No. 2003-134457, a system is proposed in which the printing is carried out after processing a photographed image especially for printing on the side of the DSC and then the photographed image is transmitted to the printer.

In Japanese Laid-Open Patent Publication No. 8-32911, a digital camera direct print system is proposed in which printing of the image can be carried out in accordance with the image from the DSC and a printing mode on the printer side such as a paper sheet size, using its own print protocol that is not generally utilized.

In Japanese Laid-Open Patent Publication No. 10-290470, the invention is directed to alleviating a processing load on the printer, and the alleviation of the processing load on the printer is implemented by performing the decompression, color conversion, resizing, and the like to the JPEG file on the side of the DSC, to carrying out the conversion processing to convert the image data into a printable data format, and transmitting the converted image data to the printer as printable data.

Further, in Japanese Laid-Open Patent Publication No. 2003-134457, unevenness of color reproduction characteristics regarding each printer is corrected on the DSC side, and the corrected image data is converted into the common image file format such as JPEG and transmitted to the printer. It is described therein that it becomes possible to obtain a stable image not dependant on printing characteristics regarding each printer.

By means of a standard called "PictBridge", which defines a communication procedure in the digital camera direct print system mentioned above, the digital camera direct print system has become more and more wide-spread. Further, a technology for obtaining high image quality in the DSC has also drastically progressed. The resolution of image data photographed and stored by the DSC had been one million to two million pixels per image at the maximum until a few years ago. However, in the recent years, the DSC which is capable of photographing and storing an image with a high resolving power of eight million or more pixels per one image has come to the market.

In accordance with the increase in the resolution in the DSC, in a digital camera direct print system, new problems as described below have arisen. (1) The pixel number to be processed on the printer side becomes larger and accordingly, the load on the printer is increased. (2) An image file size becomes larger as the pixel number increases, and accordingly, a transfer load of the image file between the DSC and the printer becomes larger.

With these being the causes, a problem has arisen such that a print speed decreases during the printing.

When a part of image processings of the image data for printing is carried out on the side of the DSC in order to share the load of the processing as described in the above known examples, a new problem arises. In each of the known examples, although there is a description about a print mode and the printing characteristics that the printer has obtained from the printer, there is no specific description as to a method for sending and receiving information on the print characteristics of the printer. For example, in a method for transmitting printing performance information of the printer to the DSC, a user can arbitrarily set and select a form of printing such as a size, or a layout within the range that a capability of the printer permits. In the print system like this, when a print condition of the printer is set on the DSC side, the setting cannot always be appropriately performed only by means of using the information from the printer. Especially, in Japanese Laid-Open Patent Publication No. 8-32911, the printer notifies currently printable print mode to the DSC and the DSC alters the print mode in accordance with the notification. For example, when a paper sheet of A4 size is set in the printer body and the printer is equipped with a sheet size detection function, the printer automatically notifies the DSC that the paper sheet size is A4. On the other hand, when the printer is not equipped with the sheet size detection function, the paper sheet size is selected by a setting panel of the printer body and the result of the selection is notified to the DSC. In either of these cases, the current print mode that the printer has recognized is notified to the DSC. That is, the setting that the user desires is not reflected as a result.

In Japanese Laid-Open Patent Publication No. 10-290470 and Japanese Laid-Open Patent Publication No. 2003-134457, there is a description that the print characteristics of the printer are obtained from the printer. However, because the image data to be transmitted to the printer is only converted based on the thus obtained print characteristics, it is not possible to carry out the image processing and the printing processing which complies with the user's desire.

In other words, it is indeed possible to utilize the capacity of the printer in the case where the setting of the print condition is performed by utilizing only the functional information of the printer. However, considering the print time and an image quality of the printing result, this is not always appropriate, or sometimes it is rather inconvenient for the user.

SUMMARY OF THE INVENTION

An aspect of the present invention is to overcome the above-described drawbacks.

In one aspect of the present invention, an image supply device for supplying image data to a printing device by directly communicating with the printing device, includes: a unit configured to obtain functional information of the printing device in accordance with a communication connection between the image supply device and the printing device, an obtaining unit configured to obtain printable range information indicating a range printable by the printing device, a unit configured to display a print setting screen based on the functional information, a conversion unit configured to, in accordance with the printable range information and a printing specification which set via the print setting screen, convert image data of an image file to be printed, and a transmission unit configured to transmit the image data converted by the conversion unit to the printing device in accordance with a data request from the printing device.

In another aspect of the present invention, an image supply device for supplying image data to a printing device by directly communicating with the printing device, includes: an obtaining unit configured to obtain information indicating maximum pixel numbers of vertical and horizontal sides of an image which is storable in the printing device, in accordance with a communication connection between the image supply device and the printing device, a designation unit configured to designate an image file to be printed, a rotation unit configured to rotate image data of the image file to be printed, and a control unit configured to control whether to perform a rotation processing by the rotation unit, in accordance with printable range information and pixel numbers of vertical and horizontal sides of the image designated by the designation unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view explaining a specific example of "information 1" (device information) according to the first embodiment.

FIG. 12 is a view explaining a specific example of "information 2" (UI setting information) according to the first embodiment.

FIG. 13 is a view showing an example of data configuration of a table that stores a maximum printable pixel number according to the first embodiment.

FIGS. 14A and 14B are views showing one example of the table data that stores the pixel number of a rectangle area to be printed according to the first embodiment.

FIGS. 16A through 16D are views explaining a layout information table and the layout thereof according to the first embodiment.

FIG. 17 is a flow chart explaining details of the setting of the resize flag and the rotation flag (step S42 of FIG. 9) in the DSC according to a second embodiment.

DETAILED DESCRIPTION OF THE EMBODIMENTS

Embodiments of the invention are described in detail below with reference to the drawings. In this embodiment, a direct printing is implemented between a digital still camera (DSC) and a printer. However, the present invention is not limited to this case.

Figure 1:
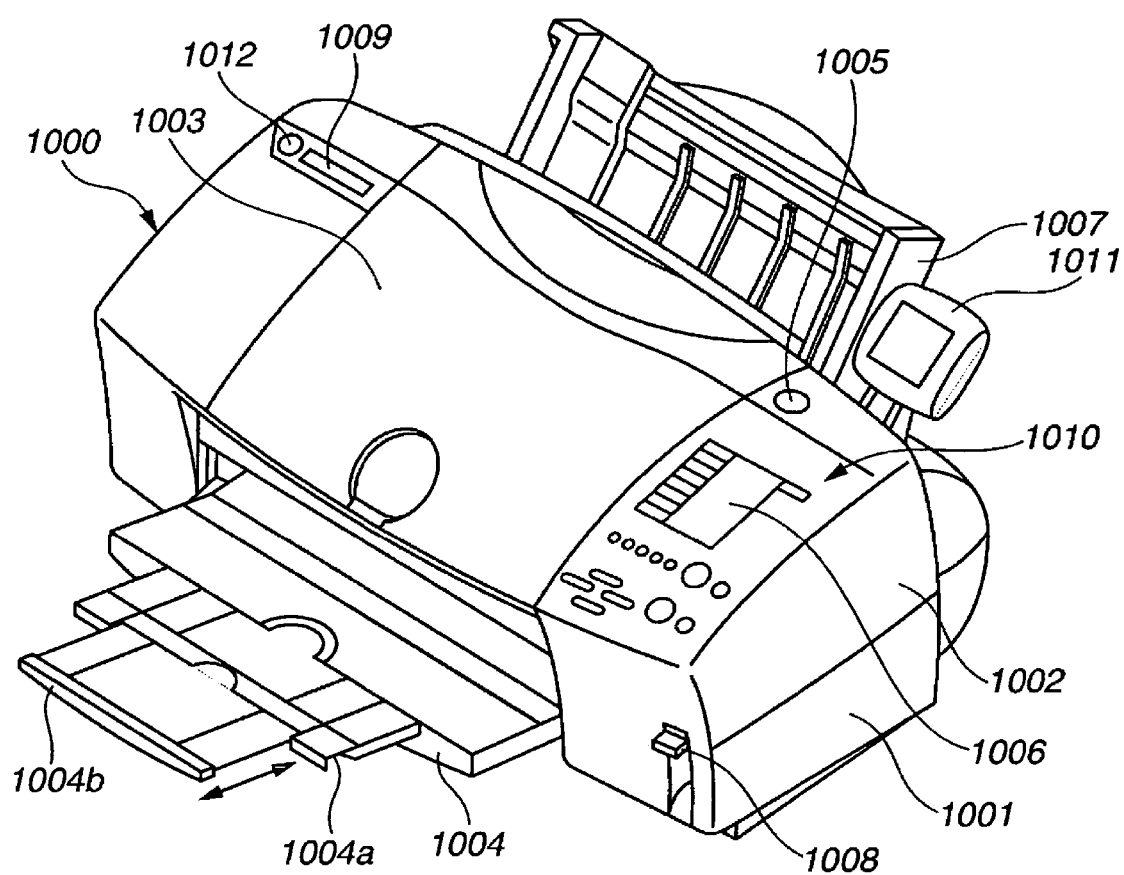
FIG. 1 is an outline perspective view of a PD printer according to a first embodiment of the present invention.

FIG. 1 is an outline perspective view of a photo direct printer device (hereinafter referred to as a PD printer) 1000 according to a first embodiment of the present invention. The PD printer 1000 functions as an ordinary printer, where printing is performed by receiving data from a host computer (PC). In addition, printing is also performed by directly reading image data stored in a storage medium such as a memory card, or by receiving image data from a digital camera, a PDA, and the like.

In FIG. 1, a printer body constituting an outer shell of the PD printer 1000 according to the first embodiment is provided with an outer surface member constituted by a lower case 1001, an upper case 1002, an access cover 1003, and a discharge tray 1004. The lower case 1001 forms a substantially lower half portion of the PD printer 1000, and the upper case 1002 forms a substantially upper half portion of the printer body, respectively. A combination of these cases contain a hollow body structure which has a storage space for storing therein each of the mechanisms which will be described later. An aperture portion is provided on each of a top face portion and a front face portion of the hollow body structure. Further, the discharge tray 1004 is configured so that one end portion thereof is held by the lower case 1001 so as to be freely rotated and that the aperture portion that is formed on the front face portion of the lower case 1001 can be opened and closed by the rotation of the discharge tray 1004. Thus, when a recording operation is executed, the aperture portion is opened by rotation of the discharge tray 1004 to the side of the front face. Thereby, a recorded paper sheet (e.g., plain paper, special paper, resin sheet, and the like, hereinafter referred to as a sheet) can be discharged from the aperture portion and the discharged sheet can be sequentially stacked. Two auxiliary trays 1004a and 1004b are incorporated into the discharge tray 1004, and by pulling each of the auxiliary trays 1004a and 1004b to the front side when necessary, a support area of the sheet can be enlarged or reduced.

The access cover 1003 is configured so that one end portion thereof is held by the upper case 1002 so as to be freely rotated and that the aperture portion formed on the top face thereof can be opened and closed. By opening the access cover 1003, it is possible to exchange a recording head cartridge (not shown), an ink tank (not shown), or the like stored inside of the printer body. Although not shown here, when the access cover 1003 is opened or closed, a protrusion formed on the backside thereof rotates a lever for opening and closing the cover. From a rotational position of the lever, an opening and closing state of the access cover 1003 can be detected by a micro switch and the like.

In addition, on the top face of the upper case 1002, a power key 1005 is provided. On a right side of the upper case 1002, an operation panel 1010, including a liquid crystal display section 1006, various types of key switches, and the like are provided. A configuration of the operation panel 1010 will be described later with reference to FIG. 2. Reference numeral 1007 denotes an automatic sheet feed section, which automatically feeds the sheet to the inside of the device body. Reference numeral 1008 denotes a sheet clearance selection lever, which is a lever for adjusting a clearance between a print head and the sheet. Reference numeral 1009 denotes a card slot. An adapter on which a memory card can be mounted is inserted into the card slot 1009 and the image data stored in the memory card can be directly read and printed via the adapter. Examples of the memory card include a CompactFlash™ memory, a SmartMedia™, and a MemoryStick™. Reference numeral 1011 denotes a viewer (e.g., liquid crystal display section 106) which is attachable and detachable to the body of the PD printer 1000. The viewer 1011 displays an image of each frame, an index image, and the like when the image to be printed is retrieved from among the images stored in a memory card. Reference numeral 1012 denotes a USB terminal for connecting a digital camera, the process of which will be described later. In addition, at the rear face of the PD device (PD printer) 1000, a USB connector for connecting a personal computer (PC) is provided.

Figure 2:
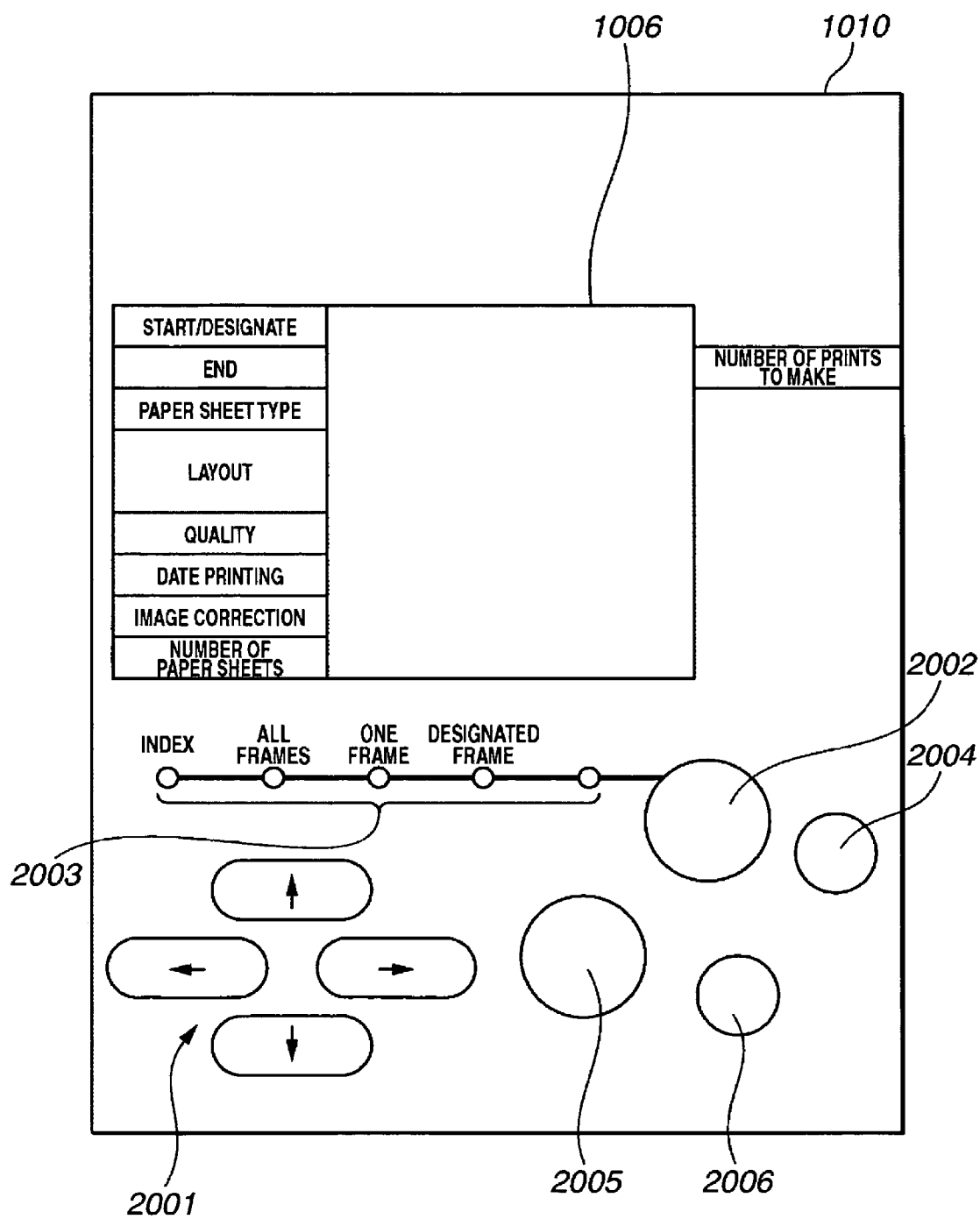
FIG. 2 is an outline view of an operation panel of the PD printer according to the first embodiment.

FIG. 2 is an outline view of the operation panel 1010 of the PD printer 1000 according to the first embodiment.

In FIG. 2, menu items for performing various kinds of setting on data related to items printed on the right and the left sides are displayed on the liquid crystal display section 1006. Items displayed on the liquid crystal display section 1006, included, for example, a front number and a designated frame number (start frame designation and printing frame designation) of a photographic image which is to be printed from among a plurality of photographic images; a number of a last photograph at which the printing is to be stopped (stop); a number of copies of printing (number of printing); a type of sheet to be used for the printing (type of sheet); a setting of a number of photographs to be printed on one sheet (layout); designation of a quality of the printing (quality); designation as to whether the photographing date is to be printed or not (date printing); designation as to whether the photograph is to be corrected for the printing (image correction); display of a number of sheets necessary for the printing (number of sheets); and the like. Each of these items is selected or designated using a cursor key 2001. Reference numeral 2002 denotes a mode key. The mode key 2002 is capable of switching a type of printing (e.g., an index printing, all-frame printing, one-frame printing, designated frame printing, and the like) every time it is pressed. In accordance with the switching, a corresponding LED 2003 turns on. Reference numeral 2004 denotes a maintenance key, which is a key for carrying out a maintenance operation, such as cleaning the print head, on the PD printer 1000. Reference numeral 2005 denotes a print startup key. The print startup key 2005 is pressed to start printing or to start a maintenance operation. Reference numeral 2006 denotes a print stop key, which is pressed to stop the printing or a maintenance operation.

Figure 3:
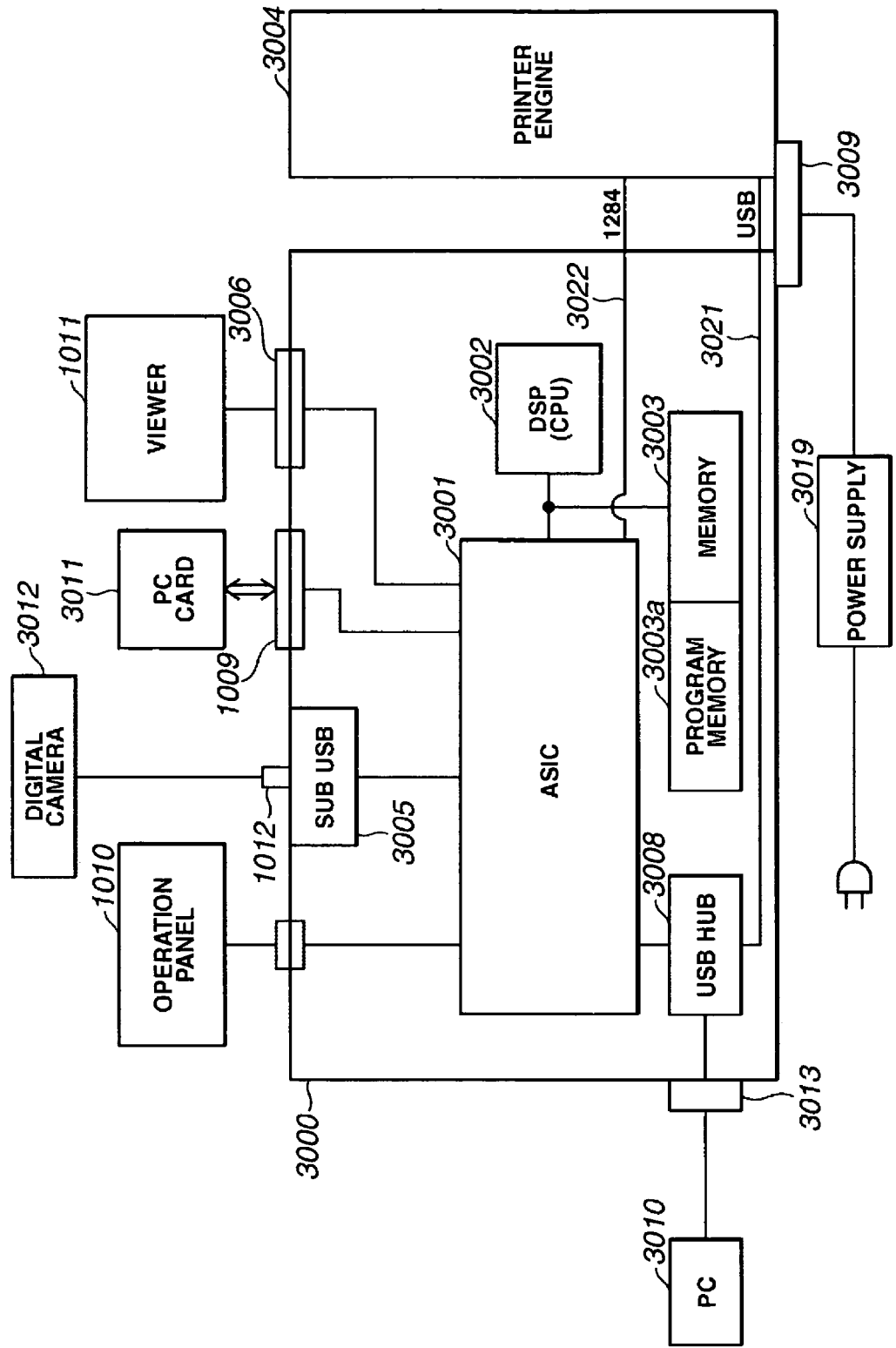
FIG. 3 is a block diagram showing a configuration of a main portion for controlling the PD printer according to the first embodiment.

Next, with reference to FIG. 3, a configuration of a primary portion for controlling the PD printer 1000 according to the first embodiment is now explained. In FIG. 3, the items of FIG. 3 that are in common with FIG. 1 are indicated with the same symbol or numeral as in FIG. 1, and an explanation of these similar items is omitted.

FIG. 3 is a block diagram showing a configuration of a main portion for controlling the PD printer 1000 according to the first embodiment.

In FIG. 3, reference numeral 3000 denotes a control section (control board). Reference numeral 3001 denotes an ASIC (specific custom LSI). Reference numeral 3002 denotes a DSP (Digital Signal Processing Processor), which contains a CPU and performs various types of control processes, described below, such as conversion from a brightness signal (RGB) to a density signal (CMYK), and image processes such as scaling, gamma conversion, and error diffusion. Reference numeral 3003 denotes a memory, which includes a program memory 3003a for storing a control program of the CPU of the DSP 3002, a RAM area (not shown) for storing a program at the time of execution, and a memory area (not shown) which functions as a work memory for storing the image data and the like. Reference numeral 3004 denotes a printer engine. The printer engine of an inkjet printer that prints a colored image using a plurality of colored ink is equipped herewith. Reference numeral 3005 denotes a USB connector, which is a port for connecting a DSC 3012. Reference numeral 3006 denotes a connector for connecting the viewer 1011. Reference numeral 3008 denotes a USB HUB. When the PD printer 1000 carries out printing on the basis of the image data from the PC 3010, the data from the PC 3010 pass through the USB HUB 3008 and is outputted to the printer engine 3004 via a USB bus 3021. Thus, the connected PC 3010 can execute printing by directly sending and receiving data to and from the printer engine 3004. Reference numeral 3009 denotes a power supply connector, which inputs DC voltage converted by a power supply 3019 from a commercial AC power source. Reference numeral 3010 denotes a common personal computer, reference numeral 3011 denotes a memory card (PC card) described above, and reference numeral 3012 denotes a digital camera (e.g., DSC).

Signal exchange between the controller 3000 and the printer engine 3004 is performed via the USB bus 3021 or an IEEE 1284 bus 3022. Outline Explanation on the Digital Camera FIG. 4 is a block diagram showing a configuration of the DSC 3012 according to the first embodiment.

Figure 4:
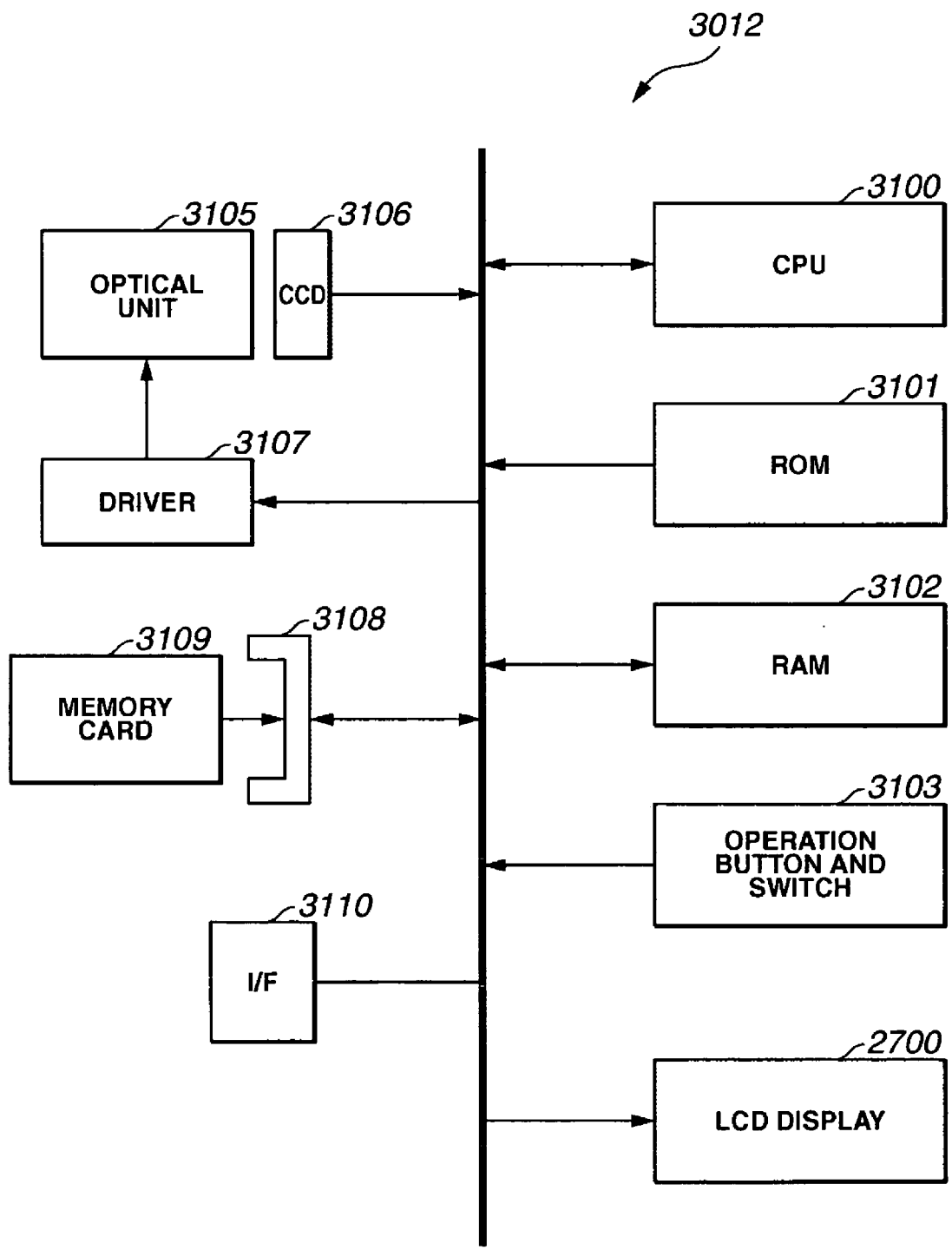
FIG. 4 is a block diagram showing a configuration of a DSC according to the first embodiment.

In FIG. 4, reference numeral 3100 denotes a CPU that controls the overall DSC 3012, while reference numeral 3101 denotes a ROM that stores the processing sequence of the CPU 3100. Reference numeral 3102 denotes a RAM that used as a work area of the CPU 3100, and reference numeral 3103 denotes a switch group used to implement various operations, and includes a shutter, a mode changeover switch, a select switch, a cursor key, and the like. Reference numeral 2700 denotes a liquid crystal display section, which is used for displaying a video image that is currently being picked up, for displaying an image that has been picked up and stored in the memory card, and for displaying a menu with various kinds of setting. Reference numeral 3105 denotes an optical unit, which is mainly comprised of a lens and a driving system thereof. Reference numeral 3106 denotes a CCD element, reference numeral 3107 denotes a driver controlled by the CPU 3100 for driving of the optical unit 3105 under control by the CPU 3100, reference numeral 3108 denotes a connector for connecting a storage medium 3109 (e.g., Compact Flash® memory card, Smart Media®, and the like), and numeral 3110 denotes a USB interface for establishing a connection to the PC 3010 or the PD printer 1000 according to this embodiment.

Overview on Direct Print

Figure 5:
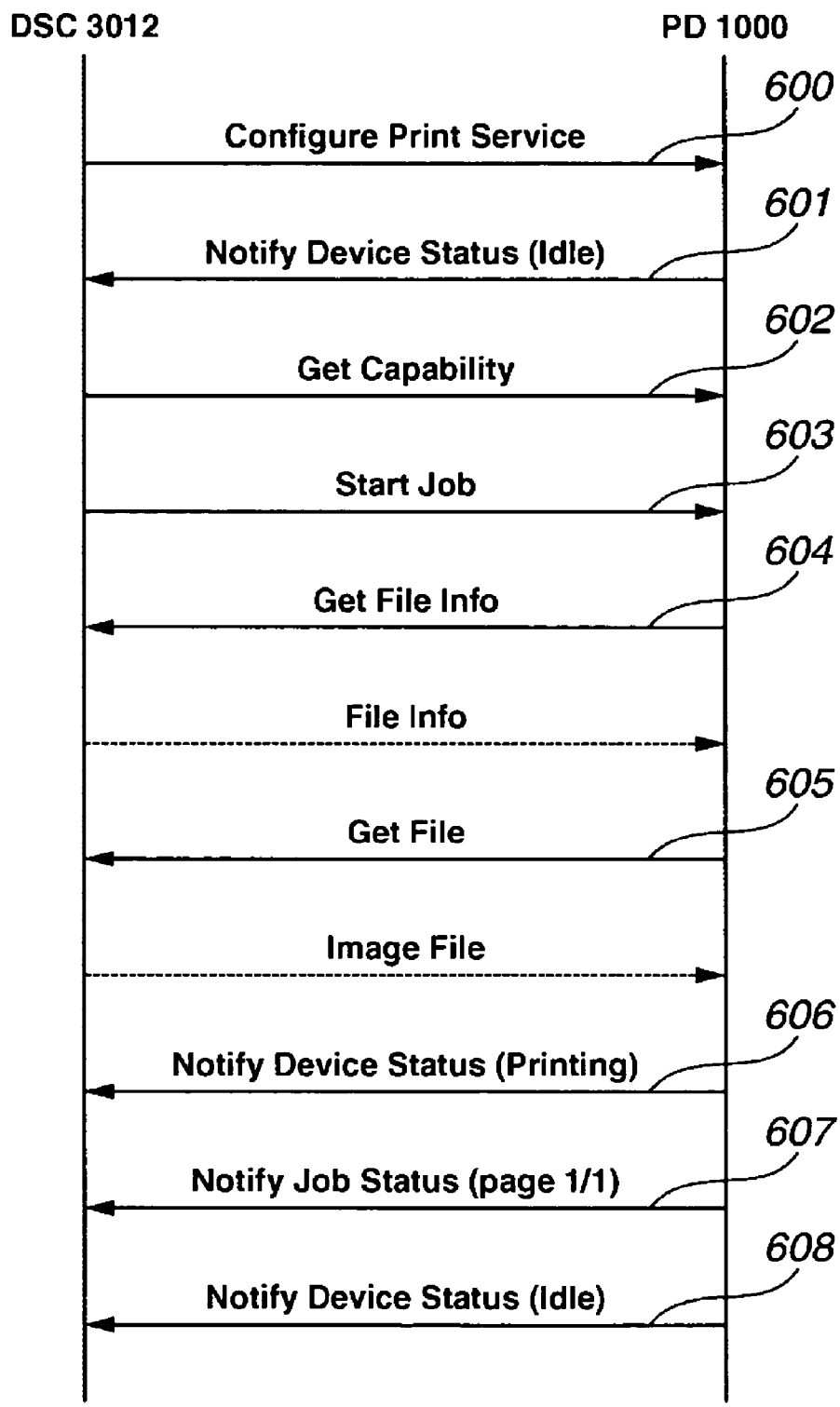
FIG. 5 is a view that explains an approximate signal flow in a case where printing is performed by issuing a print request from the DSC to the PD printer in a printing system according to the first embodiment.

FIG. 5 is a view that explains a general signal flow in a case where the printing is performed by issuing a print request from the DSC 3012 to the PD printer 1000.

This processing sequence is executed after the PD printer 1000 and the DSC 3012 are mutually connected via a USB cable or after it is confirmed by radio communication that both the PD printer 1000 and the DSC 3012 comply with a digital photo solutions (DPS) specification. First, in step 600, the DSC 3012 transmits "ConfigurePrintService" to the PD printer 1000 to check on a state of the PD printer 1000. In response to receipt of the "ConfigurePrintService", in step 601, the PD printer 1000 notifies the DSC 3012 of the state of the PD printer 1000 at that time (in this case, "idle" state). Because the state is "idle" in this case, in step 602, the DSC 3012 inquires about a capability of the PD printer 1000, and issues a print startup request (StartJob) in step 603, which is in accordance with the capability (603). More specifically, the print startup request is issued from the DSC 3012 to the PD printer 1000 on condition that "newJobOK" (described below), which is among the status information received from the PD printer 1000 in step S601 is set to "True."

In response to the print startup request, in step 604, the PD printer 1000 requests file information (GetFileInfo) from the DSC 3012 on the basis of a file ID of the image data to which printing has been instructed. In response to the request, the file information (FileInfo) is transmitted from the DSC 3012. The file information includes information such as a file capacity. Then, if the PD printer 1000 determines that the processing is executable after receiving the file information, in step 605, the PD printer 1000 requests the file information (GetFile) from the DSC 3012. Thus, the image data of the requested file (ImageFile) is sent from the DSC 3012 to the PD printer 1000. When the PD printer 1000 starts the print processing, status information that shows "now in the printing (Printing)" is sent from the PD printer 1000 to the DSC 3012 in step 606, with "NotifyDeviceStatus" status message. Then, when the print processing for one page is completed, in step 607, a notification to that effect is sent from the PD printer 1000 at the time of startup of processing of a next page with a "NotifyJobStatus" status message. Then, in a case of printing only one page, when the requested printing of one page is completed, in step 608, a notification that the PD printer 1000 is in the "idle" state is issued with a "Notify Device Status" status message (Notify Device Status (Idle)).

It is to be noted that in a case of an N-up printing, in which printing is performed with a plurality of (N) images being laid out in one page, the "NotifyJobStatus" status message is sent from the PD printer 1000 to the DSC 3012 every time N images are printed. A timing of issuing a "NotifyJobStatus" and a "NotifyDeviceStatus" status message and an order for obtaining the image data in the present embodiment is merely one example. Various other cases may occur depending on how a particular product is implemented.

Figure 6:
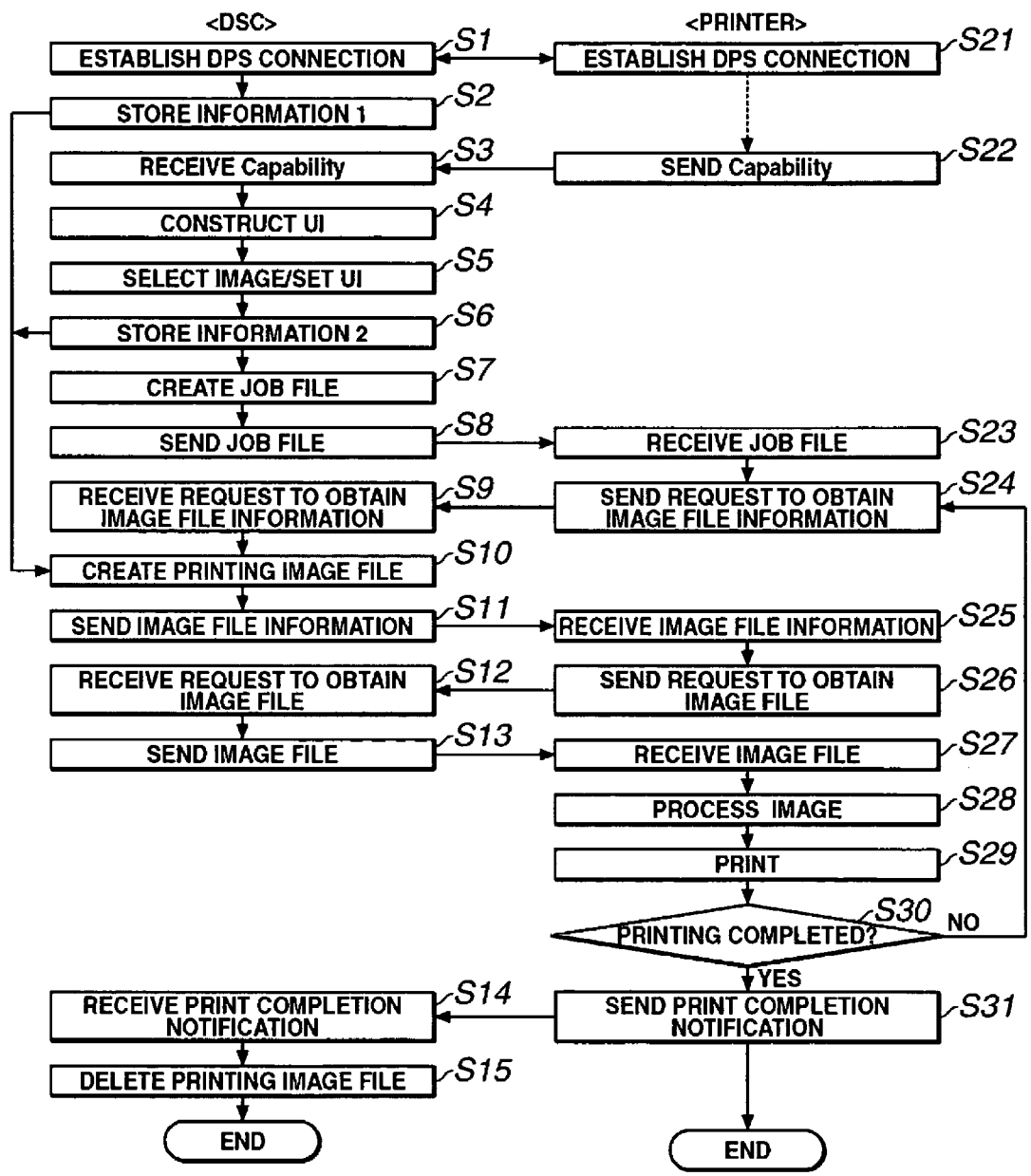
FIG. 6 is a view explaining a processing in a case where printing is executed by communicating between the digital still camera and the PD printer and by supplying image data from the DSC to the PD printer according to the first embodiment.

FIG. 6 is a view showing the processing in a case where the printing is executed by communicating between the DSC 3012 and the PD printer 1000 according to the first embodiment, and by supplying the image data from the DSC 3012 to the PD printer 1000. In FIG. 6, steps S1 through S15 indicate the processings in the DSC 3012, while steps S21 through S31 indicate the processings in the PD printer 1000.

In steps S1 and S21, it is confirmed that both the PD printer 1000 and the DSC 3012 comply with the DPS specification. In this state, the DSC 3012 makes an inquiry to the PD printer 1000 about a status of the printer and device information. In response to the inquiry, the state of the PD printer 1000 at that time and the device information are provided by the PD printer 1000. The device information includes a version of a connection protocol, a vendor name, a model name of the printer, and the like. Thus, in step S2, the DSC 3012 stores the state of the printer and "information 1", which is necessary among the device information, in the RAM 3102. The "information 1" includes information that is necessary in converting the image file in the DSC 3012. Next, the DSC 3012 requests the Capability from the PD printer 1000 (step 602 of FIG. 5).

In step S22, the PD printer 1000 creates capability information (Capability) relating to a printing function of the PD printer 1000 and transmits it to the DSC 3012. The DSC 3012 receives the Capability in step S3. Next, in step S4, the DSC 3012 constructs a user interface (UI) based on the Capability and displays the UI on the display 2700. The item displayed on the UI include, but are not limited to, paper sheet sizes, paper types, and whether layout printing of 1-up, 2-up, and 4-up is executable in "bordered" or "borderless" mode.

Next, in step S5, a user refers to the UI to select the image (s) to be printed, and sets a printing format of the image(s). The setting of the printing format of the image(s) is performed based on a number of printing sheets, a paper sheet size, the layout, and the like, which are included in the Capability of the PD printer 1000 received in the step S3. In step S6, "information 2", which has been set by the user, is stored in the RAM 3102. The "information 2" includes information such as the paper sheet size, or the layout that has been set by the user via the UI.

When the user instructs startup of printing via the UI, the processing proceeds to step S7. In step S7, a print job file for instructing the printing is created. Then, in step S8, the created print job file is transmitted by the DSC 3012, and received by the PD printer 1000 in step S23. Next, in a step S24, the PD printer 1000 prepares to print the received print job file by analyzing it. After analyzing the print job file, the PD printer 1000 issues a request to the DSC 3012 to obtain image file information (image file name) intended for printing which is described in the print job file.

The request to obtain the image file information is in a service that operates in a PTP (PictureTransferProtocol). In the present embodiment, the request results in the present embodiment's feature of transmission of a creation timing of the image file from the PD printer 1000 to the DSC 3012. This is just one example of obtaining the creation timing of an image file. Any other method that would enable the practice of the present invention is applicable.

After the request to obtain the image file information is received by the DSC 3012 in step S9, the processing proceeds to step S10. In step S10, the processing for creating the image file for printing is executed. This processing is a feature of the first embodiment. The processing of the step S10 is described in detail below. Next, in step S11, information on the image file for printing (Object Info Dataset: including the image file name, the data size, the directory, the date, and the like) which has been created, is transmitted to the PD printer 1000.

In step S25, the PD printer 1000 receives the image file information, and in step S26, upon receipt of the image file information, transmits a request to the DSC 3012 to obtain the designated image file itself for printing. Upon receipt of the request to obtain the image file in step S12, the DSC 3012 transmits the requested image file for printing to the PD printer 1000 in step S13.

The PD printer 1000, in step S27, receives the requested image file, and then in step S28, decodes the image data of the image file, performs the image processing, and converts the image data into the image of a form in which PD printer 1000 can output the data. Then, in step S29, printing is carried out based on the converted image data. In step S30, it is determined whether printing of the image data is completed. If printing is not completed because, for example, a sufficient buffer area for storing the received image data cannot be ensured in the PD printer 1000 and the image data of the image file is being divisionally received and processed, processing returns to step S24, where the request to obtain the image file information is again transmitted to the DSC 3012. Then, in the same procedure as described above, partial data of the image data of the image file is received and printed in step S27.

If printing of the image data is completed in step S30, the processing proceeds to step S31. In step S31, the PD printer 1000 notifies the DSC 3012 that printing of the image file is completed.

The DSC 3012, which receives the print completion notification in step S14, proceeds to delete the image file from the RAM 3102 in step S15, and ends the processing. An original image file, however, which is stored in the memory card 3109, is retained as is.

If, in step S29, an amount of the obtained image data is not sufficient, for example, the amount of the obtained image data is smaller than an amount of data recorded in one line scanning of a recording head, the printing processing in step S29 cannot be performed. In the case where a printing operation cannot be performed in step S29, the processing proceeds to step S24 after the determination in step S30 is made. Even though the printing operation in step S20 cannot be performed, the image processing in step S28 can be performed.

As previously discussed, after the creation of the image file is completed in the step S10, the image file information is transmitted from the DSC 3012 to the PD printer 1000 in step S11. This transmission is in response to the request to obtain the image file information (Get Object Info) issued from the PD printer 1000 in step S24. The image file information, as well as the request to obtain the image file information is used to notify the PD printer 1000 that the processing of conversion and creation of the image file has been completed in the DSC 3012. Accordingly, transmission of the image file information in the first embodiment is not limited to this, and other specific commands and an existing communication command may be utilized.

In a case where the image data of the image file is divisionally received, the printing time becomes very long because rasterization and conversion to the data for printing, as well as transmitting and receiving of the image data, have to be performed many times.

Figures 7, 8:
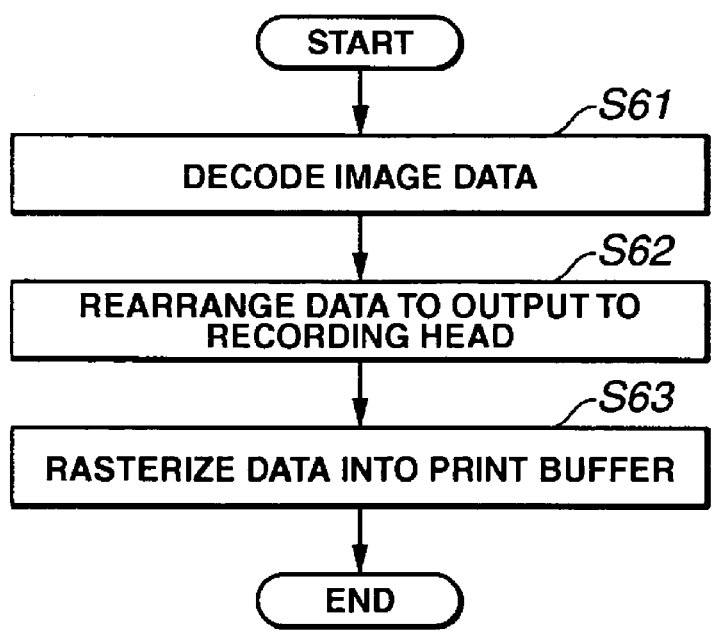
FIG. 7 is a view showing one example of a schema of Capability information that is transmitted from the PD printer to the DSC in a step S22 of FIG. 6.
FIG. 8 is a flow chart explaining a processing of the image data in the PD printer (step S28) according to the first embodiment.

FIG. 7 is a view showing one example of a schema of the Capability information that is transmitted from the PD printer 1000 to the DSC 3012 in step S22 of FIG. 6. In the schema, the paper sheet size which the PD printer 1000 can use (paper-Sizes) is described. "<paper Sizes> 80010000 80010001 80010002" in row 701 indicates paper sheet size.

In the PD printer 1000 according to the first embodiment, paper sizes of A4-size, L-size, and 2L-size can be used. Here, 8-digit numeric sequences of "80010000", "80010001", and "80010002" indicate A4-size, L-size, and 2L-size, respectively. Correspondence between these numeric sequences and the paper size is previously determined between the PD printer 1000 and the DSC 3102. Therefore, the DSC 3012 that receives the schema can positively identify the paper sheet size that the PD printer 1000 can use.

FIG. 8 is a flow chart explaining a processing of the image data in the PD printer 1000 (step S28 of FIG. 6) according to the first embodiment.

First, in step S61, the image data received from the DSC 3012 is decoded. Next, in step S62, in order to output the coded data to the recording head (i.e., inkjet head) of the printer engine 3004, the image data is rearranged. Then in step S63, the rearranged data is rasterized into the print buffer.

Thus, according to the first embodiment, resizing, rotation, and color conversion of the image data are not necessary in the processing of the image data in the PD printer 1000. Therefore, the image processing in the PD printer 1000 is simplified and the load on the PD printer 1000 can be alleviated.

Figure 9:
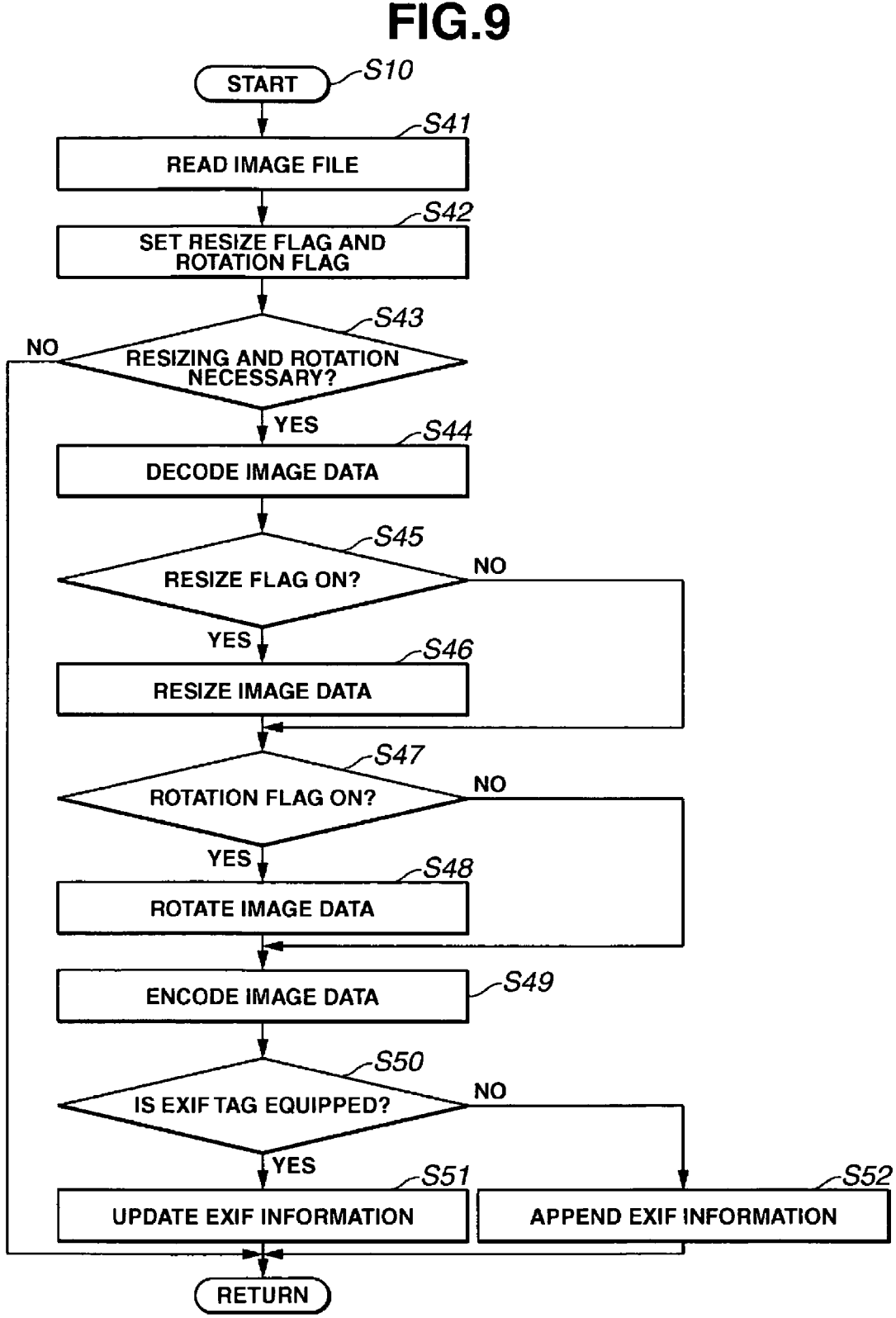
FIG. 9 is a flow chart explaining a processing of image file creation in the DSC according to the first embodiment (step FIG. 10 is a flow chart explaining details of setting of a resize flag and a rotation flag (step S42 of FIG. 9) in the DSC according to the first embodiment.

FIG. 9 is a flow chart explaining the processing of image file creation in the DSC 3012 according to the first embodiment (step S10 of FIG. 6).

First, in step S41, the image data of the image file to be processed (printing object), which is stored in the memory card 3109, is read. Next, in step S42, a resize flag and a rotation flag are set. The resize flag and the rotation flag are flags showing whether it is necessary to carry out the processing of zooming and rotation of the image data. Both the resize flag and the rotation flag are provided in the work area of the RAM 3102. When the flags are set to ON ("1"), it shows that it is necessary to carry out the processing corresponding to the flags. When the flags are set to OFF ("0"), it shows that it is not necessary to carry out the processing. The processing in step S42 is described in detail below.

Next, in step S43, it is determined whether it is necessary to carry out the processing such as resizing or rotation, that is, whether either of the flags are set to "1". In a case where either the resize flag or the rotation flag is set to ON, the processing proceeds to step S44. However, in a case where both the resize flag and the rotation flag are set to OFF ("0"), it is not necessary to carry out resizing or rotation, and therefore the processing ends.

The original image file that is read in step S41 is encoded by, for example, JPEG. In step S44, the original image file is decoded and converted into a raw image data. Next, in step S45, it is determined whether resizing (reduction) of the image is necessary. When it is necessary (i.e., when the resize flag is set to "1"), the processing proceeds to step S46. In step S46, the image data obtained in step S44 is reduced in accordance with a designated reduction ratio. After step S46 is executed, or if it is not necessary to resize the image in step S45, the processing proceeds to step S47. In step S47, it is determined whether the rotation of the image is necessary. When it is necessary (i.e., when the rotation flag is set to "1"), the processing proceeds to step S48 and the rotation processing of the image data obtained in step S44 is executed, and the processing proceeds to step S49. However, if it is not necessary to rotate the image, the processing proceeds from step S47 to step S49.

In step S49, the processed image data is JPEG-coded again. Next, the processing proceeds to step S50. In step S50, it is determined whether the image data is equipped with an "EXIF" tag. When it is equipped, in step S51, the "EXIF" tag is updated in accordance with a content of the conversion carried out in steps S46 and S48. On the other hand, when it is determined in step S50 that the image data is not equipped with the "EXIF" tag, the processing proceeds to step S52. In step S52, "EXIF" information, for example, orientation information showing a direction of the image, is appended to the image data.

A specific example of the processing in step S51 is now explained. As an attached information to "TIFF Rev.6.0", which is used in EXIF, the image direction (tag number "274": Orientation) is defined, and according to this information, "1" (default) is defined as "0th row is at a top of the visual image, and 0th column is at a right side of the visual image". If the image of a direction defined as "1" is rotated counter-clockwise by 90 degrees, the image direction of the EXIF tag is changed to "8", that is, "0th row is at a left of the visual image, and 0th column is at a bottom of the visual image". Thus, the EXIF information is updated in accordance with the rotation and resizing of the image. With regard to the details of the EXIF tag, refer to "Digital Still Camera Image File Format Standard (Exchangeable image file format for Digital Still Camera: Exif)".

Figure 10:
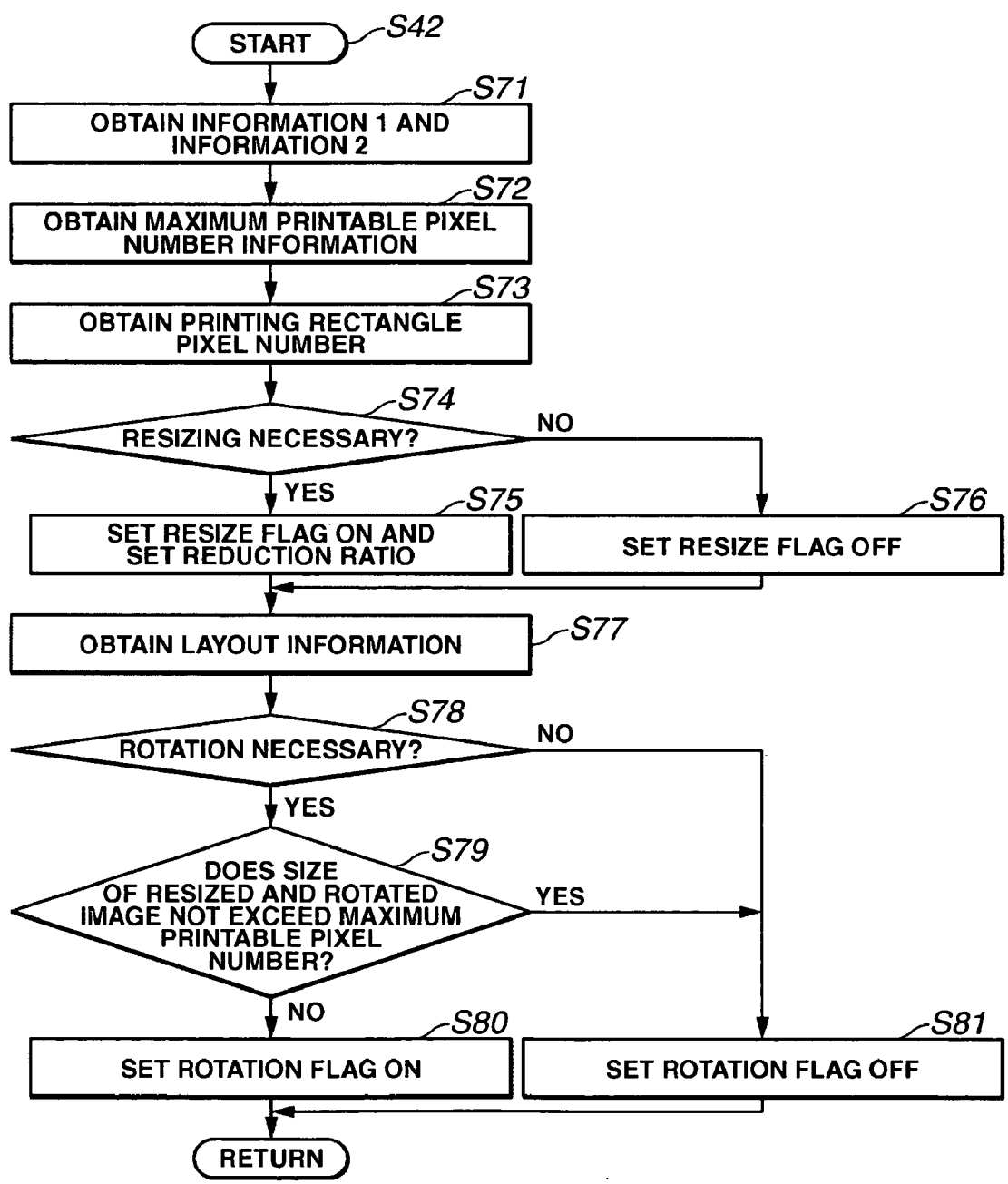

FIG. 10 is a flow chart explaining details of the setting processing of the resize flag and the rotation flag (step S42 of FIG. 9) in the DSC 3012 according to the first embodiment.

First, in step S71, the "information 1" and the "information 2", which are stored in the RAM 3102 in steps S2 and S6 of FIG. 6, are obtained. Here, the "information 1" is the device information that includes, for example, the vendor (Vendor) name, the model name, and version (Version) information.

FIG. 11 is a view explaining a specific example of the "information 1" (device information).

In FIG. 11, the vendor name, the machine kind name, and the version of the PD printer 1000 are described.

FIG. 12 is a view explaining a specific example of the "information 2" (UI setting information).

In FIG. 12, setting contents such as the paper sheet size, the paper sheet type, layout information, or bordered/borderless printing in the PD printer 1000 are described.

Turning back to FIG. 10, in step S72, a maximum printable pixel number in the PD printer 1000 is obtained.

FIG. 13 is a view showing an example of a data configuration of a table that stores the maximum printable pixel number.

The maximum printable pixel number table is stored in the ROM 3101 or the RAM 3102 of the DSC 3012. In this table, the information that shows the maximum printable pixel number is stored in relation to the vertical and horizontal directions, respectively, in accordance with the machine type of the printer and with every version thereof.

Accordingly, in step S72, by using the model name and the version information included in the "information 1" obtained in step S71, the maximum printable pixel number is retrieved from the maximum printable pixel number table. As a result of the retrieval, if the model name is "Model A", and the version is "1.00", then, the maximum printable pixel number is 4,800 pixels vertically and 6,400 pixels horizontally. The maximum printable pixel number information is not limited to the present embodiment and may include other information.

Next, in step S73, the pixel number of a rectangle area to be printed by the PD printer 1000 is obtained.

FIGS. 14A and 14B are views showing one example of the table data that stores the pixel number of the rectangle area to be printed. The table is stored in the ROM 3101 or the RAM 3102 of the DSC 3012. In addition, because the table may include the information depending on the model, there may be cases where a plurality of tables are present.

FIG. 14A shows an example of the data of the table that defines the maximum pixel number to be printed in relation to the paper sheet type, the printing layout, and the paper sheet size to be used for the printing in the printer named "Model A". FIG. 14B shows an example of the table data that defines the maximum pixel number of the printing according to the paper sheet type, the printing layout, and the paper sheet size that are used for the printing in the printer named "Model B".

For example, when printing is carried out by the printer named "Model A" on the plain paper of A4 size on a condition of 1-up and bordered, 2,400×3,300 pixels are printed. On the other hand, when printing is carried out by the printer named "Model B" on a plain paper of A4 size on a condition of 1-up and bordered, 4,800×6,600 pixels are printed.

Thus, in step S73, by using the "information 1" obtained in the step S71, a rectangle pixel number information table (e.g., FIG. 14A or 14B) corresponding to the PD printer 1000 is determined. In the same way, by using the "information 2", a desired pixel number is computed from the rectangle pixel number information table. When, for example, "Model A" is determined from the "information 1", and "photographic paper", "A4", and "1-up-bordered" are obtained from the "information 2" by this retrieval, it turns out that the rectangle pixel number in this case is 4,800×6,600. The configuration of the rectangle pixel number information table is not limited to this embodiment and may include other information.

Next, in step S74, from the maximum printable pixel number and the rectangle pixel number of the PD printer 1000, which have been obtained in steps S72 and S73, it is determined whether the resizing of the image data is necessary. In a case where it is determined that the resizing is necessary, the processing proceeds to step S75. In step S75, the resize flag of the RAM 3102 is set to ON ("1"), and its reduction ratio is computed and stored in the RAM 3102. On the other hand, in a case where it is determined that the resizing is not necessary, the processing proceeds to step S76 where the resize flag is set to OFF ("0").

Figure 15:
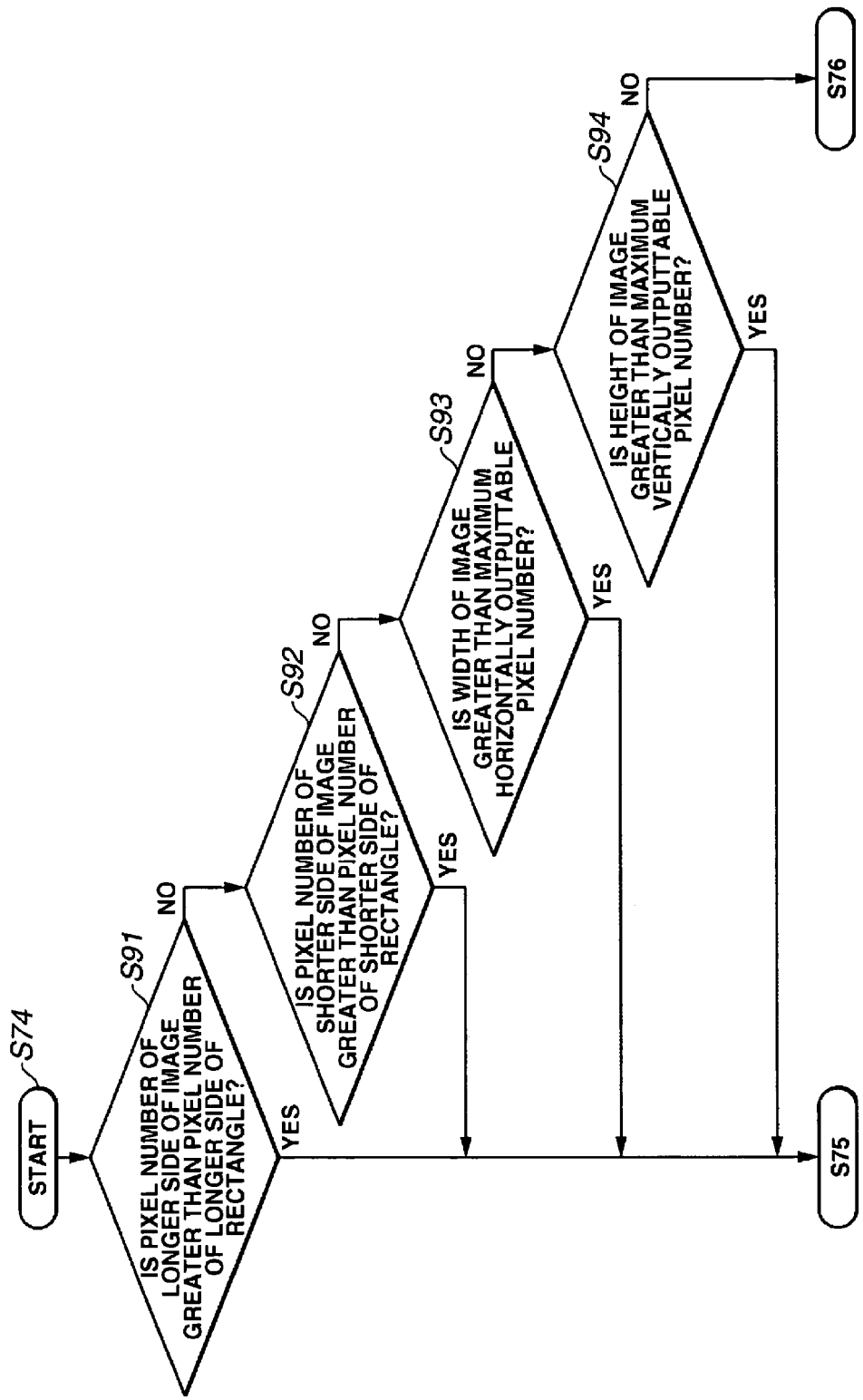
FIG. 15 is a flow chart explaining details of a processing for determining whether resizing is necessary or not in a step S74 of FIG. 10.

FIG. 15 is a flow chart explaining details of the processing in step S74 for determining whether the resizing is necessary.

First, in step S91, the pixel number of a longer side of the image data intended for printing and the pixel number of a longer side of the printing rectangle in the PD printer 1000 are compared to each other. If pixel number of the longer side of the image data is greater than the pixel number of the longer side of the printing rectangle, the resizing processing is necessary, and the processing proceeds to step S75 of FIG. 10. On the other hand, if the pixel number of longer side of the image data is equal to or smaller than the pixel number of the longer side of the printing rectangle, the resizing processing is not necessary as to the longer side of the image data, and the processing proceeds to step S92. In step S92, the comparison is performed in the same way for the shorter side. If the pixel number of the shorter side of the image data is greater than the pixel number of the shorter side of the printing rectangle in the PD printer 1000, the resize processing is necessary, and the processing proceeds to step S75 of FIG. 10. On the other hand, if the pixel number of the shorter side of the image data is equal to or smaller than the pixel number of the shorter side of the printing rectangle area, the resize processing is not necessary, and the processing proceeds to step S93. In steps S93 and S94, the size of the image data and the maximum printable pixel number in the PD printer 1000 are compared to each other.

First, in step S93, a pixel number in the horizontal direction of the image data and the maximum printable pixel number in the horizontal direction are compared. If the pixel number in the horizontal direction of the image data is greater than the maximum printable pixel number in the horizontal direction, the resizing processing is necessary, and the processing proceeds to step S75 of FIG. 10. On the other hand, if the pixel number in the horizontal direction of the image data is equal to or smaller than the maximum printable pixel number in the horizontal direction, the resizing processing is not necessary, and the processing proceeds to step S94. In step S94, the pixel number of the image data in the vertical direction and the maximum printable pixel number in the vertical direction are compared. If the pixel number in the vertical direction of the image data is greater than the maximum printable pixel number in the vertical direction, the resizing processing is necessary, and accordingly, the processing proceeds to step S75 of FIG. 10. On the other hand, if the pixel number in the vertical direction of the image data is equal to or smaller than the maximum printable pixel number in the vertical direction, the resizing processing is not necessary, and the processing proceeds to step S76 of FIG. 10.

Returning to FIG. 10, after step S75 or step S76 is executed, the processing proceeds to step S77 to obtain the layout information.

FIGS. 16A through 16D are views explaining a layout information table and the layout thereof according to the first embodiment. The layout information table is provided in the ROM 3101 or the RAM 3102 of the DSC 3012. In addition, because there is a case where the layout information table includes information depending on the model, a plurality of the layout information tables can be present.

FIG. 16A shows an example of the layout information table of the machine, "Model A". FIG. 16B explains the direction of the image to be laid out and printed and a direction in which the paper sheet is conveyed in the machine, "Model A".

Likewise, FIG. 16C shows an example of the layout information table of the machine, "Model B". FIG. 16D explains the direction of the image to be laid out and printed and a direction in which the paper sheet is conveyed in the machine, "Model B".

The direction of conveyance of the paper sheet corresponds to the vertical direction of the printed image. In other words, in the machine, "Model A", all paper sizes except for a case of 2-up are vertically oriented images (i.e., portrait), while in the machine, "Model B", all paper sizes except for a case of 2-up are horizontally oriented images (i.e., landscape).

Thus, in step S77 of FIG. 10, by using the "information 1" obtained in step S71, the layout information table (e.g., FIG. 16A or FIG. 16C) of the PD printer 1000 is determined. Likewise, by using the "information 2", a retrieval is carried out within the layout information table. By this retrieval, in the case of the machine, "Model A", by referring to the table shown in FIG. 16A, a shape of the printing rectangle corresponding to the paper size of "A4", the layout of "1-up", and the like, is obtained from the "information 2" as the portrait (vertically oriented rectangle). The configuration of the layout information as shown in FIGS. 16A and 16C is not limited to this embodiment and may include other information.

Returning to FIG. 10, in step S78, based on the layout information obtained in step S77, it is determined whether rotation of the image data is necessary. In a case where it is determined that the rotation is necessary, the processing proceeds to step S79. On the other hand, in a case where it is determined that the rotation is not necessary, the processing proceeds to step S81. In step S81, the rotation flag is set to OFF ("0") and the processing ends. For example, when the image data is expressed in a horizontally oriented image and the size thereof is 4,800 pixels vertically and 6,400 pixels horizontally, if the printing layout is vertically oriented (portrait), it is determined that the rotation of the image data is necessary because the rectangle shape of the image data (horizontally oriented rectangle) and the shape of the printing rectangle (vertically oriented rectangle) are different from each other.

In step S79, it is determined whether the size of the image data after rotation does not exceed the maximum printable pixel number of the PD printer 1000. At this time, if the resize flag is set to ON ("1"), the size of the rotated image data resized in accordance with the reduction ratio retained in the RAM 3102, and the maximum printable pixel number are compared to each other. If it is determined that the size of the image data after rotation does not exceed the maximum printable pixel number, the processing proceeds to step S80. In step S80, the rotation flag is set to ON ("1") and the processing ends. On the other hand, if it is determined that the size of the image data after rotation exceeds the maximum printable pixel number in step S79, the processing proceeds to step S81. In step S81, the rotation flag is set to OFF ("0") and the processing ends. Here, the rotation flag is set to OFF to prevent the unsuccessful printing in the PD printer 1000 due to excess of the size of the image data over the maximum printable pixel number caused by the rotation of the image data. For example, in a case where the resize flag is set to OFF, the size of the original image data is 4,800 pixels vertically and 6,400 pixels horizontally, and the maximum printable pixel number in the PD printer 1000 is 4,800 pixels vertically and 6,400 pixels horizontally. If the image data is rotated clockwise by 90 degrees, then, the size of the image data is altered to 6,400 pixels vertically and 4,800 pixels horizontally. Thus, the vertical size of the image data (6,400 pixels) exceeds 4,800 pixels, which is the maximum printable pixel number of the PD printer 1000 in the vertical direction, and as a result, the PD printer 1000 cannot carry out the printing. Therefore, in this case, the image data is processed as the image data having 4,800 pixels vertically and 6,400 pixels horizontally.

In the above explanation, the DSC 3012 is capable of obtaining the "information 1" including the device information of the PD printer 1000 and the Capability, and constructing and displaying the UI in accordance with the function of the PD printer 1000. In addition, the DSC 3012 is capable of obtaining and storing in the memory the "information 2" which is set by the user of the DSC 3012 on the basis of the UI, and of obtaining the information on maximum printable pixel number of the PD printer 1000 from one of the "information 1" and the "information 2". Further, the DSC 3012 is capable of creating and transmitting, based on the information, to the PD printer 1000 the image data to be printed. Thereby, an amount of the image data transmitted from the DSC 3012 to the PD printer 1000 and the format of the image data can correspond with a printing condition in the PD printer 1000. As a result, the load required for the processing the image data in the PD printer 1000 is alleviated and a memory capacity required by the PD printer 1000 in the processing the image data is reduced.

In addition, because the image data transmitted to the PD printer 1000 is reduced in its size in advance in accordance with the paper sheet size and the printing format in the PD printer 1000, it is possible to reduce the time required to transmit the image data.

Further, because the DSC 3012 is capable of recognizing the maximum printable pixel number of the PD printer 1000, it is possible to transmit the image data by reducing the size of the image data in advance when the size of the image data is larger than the maximum printable pixel number. In addition, if the size of the image data exceeds the maximum printable pixel number of the PD printer 1000 due to the rotation of the image data, the image data is transmitted to the PD printer

1000 without rotation. It is therefore possible to prevent a failure in printing the image due to the rotation of the image data.

According to the first embodiment as described above, the following can be achieved.

(1) Because the image data is transmitted to the PD printer 1000 after the image data is subjected to processes such as rotation or resizing by the DSC 3012, it is not necessary to provide the PD printer 1000 with a special and expensive image processing function. In addition, the image processing can be simplified. Thereby, it is possible to carry out the printing at a high speed.

(2) In creating the image file which is subjected to image processing by the DSC 3012, the UI on the basis of functional information obtained from the PD printer 1000 is created by the DSC 3012 and the printing is carried out in accordance with the printing condition set by the user using the UI. Accordingly, printing can be carried out making use of the printing function of the PD printer 1000.

(3) Because the DSC 3012 is capable of recognizing the maximum printable pixel number of the PD printer 1000 and determines whether processes such as resizing or rotation of the image data is necessary on the basis of the information on the maximum pintable pixel number, it is possible to create the image file corresponding with performance of the PD printer 1000.

(4) Because only the image data to be used for printing is transmitted to the PD printer 1000, the transmission of other, non-required data from the DSC 3012 to the PD printer 1000 can be prevented. Moreover, it is possible to hold down the required memory capacity of the PD printer 1000 to a minimum. Further, the time from the start of the data transmission to the PD printer 1000 by the DSC 3012 camera until the printing of the first image can be reduced.

If the size of the image data exceeds the maximum printable pixel number due to the rotation of the image data and accordingly printing cannot be carried out by the PD printer 1000, reducing the image data by resizing can be considered. However, in this case, the image quality is naturally degraded.

Accordingly, in a case where the speed priority printing, instead of the image quality priority printing, is desired in advance in the setting on the DSC 3012 side or in the setting on the PD printer 1000 side, when the pixel number of either of the vertical side or the horizontal side exceeds the maximum printable pixel number (the pixel number which can be stored by the PD printer 1000), it is preferable that the resize processing is carried out when the image data is subjected to the rotation processing. In this way, the pixel number of the image data is limited within the maximum pixel number that can be stored in the PD printer 1000.

In this case, when determining whether the image quality priority printing or the speed priority printing is set, the setting can be performed in the DSC 3012 by providing a menu for setting a priority mode on the UI for setting the print mode. In addition, the menu for designating the priority mode may be made enabled to be set at anytime.

However, if a warning is displayed when the pixel number of either of the vertical side or the horizontal side exceeds the maximum printable pixel number (the pixel number which can be stored by the PD printer 1000) due to the rotation processing, a user can be relieved of performing the unnecessary setting which may degrade the image quality, and accordingly, the satisfaction of the user becomes much higher.

That is, because it is likely that the user who handles the image data of which the pixel number exceeds the maximum pixel number, primarily and strongly desires the high image quality.

Next, a second embodiment of the present invention is explained. A hardware configuration of the DSC 3012 and the PD printer 1000 according to the second embodiment is the same as that of the first embodiment, and accordingly, the explanation thereof is omitted. In addition, the processing wherein printing is carried out by communicating between the DSC 3012 and the PD printer 1000 and supplying the image data from the DSC 3012 to the PD printer 1000 according to the second embodiment, is the same as in the first embodiment, the explanation thereof is omitted. Further, because the creation processing of the image file in the DSC 3012 according to the second embodiment is the same as the first embodiment described above the explanation thereof is omitted.

FIG. 17 is a flow chart explaining the setting of the resize flag and the rotation flag (step S42 of FIG. 9) in the DSC 3012 according to the second embodiment. In FIG. 17, the processing in common with FIG. 10 is represented with the same symbol(s) and the explanation thereof is omitted.

In step S79, if the size of the image data after rotation exceeds the maximum printable pixel number of the PD printer 1000, the processing proceeds to step S101. In step S101, the resize flag of the RAM 3102 is set to ON ("1") and in order to make the size of the image data after rotation fit in the maximum printable pixel number in the PD printer 1000, the reduction ratio for reducing the image data is computed. Then, the reduction ratio thus computed is stored in the RAM 3102, and the processing proceeds to step S80. In the step S80, the resize flag is set to OFF. For example, the size of the original image data is 4,800 pixels vertically and 6,400 pixels horizontally, and the maximum pixel number printable by the PD printer 1000 is 4,800 pixels vertically and 6,400 pixels horizontally. In this case, if the image is not rotated, no problems arise because the size of the image data is the size containable in the printable area. However, if it is determined to rotate the image data clockwise by 90 degrees, the size of the image data after the rotation becomes 6,400 pixels vertically and 4,800 pixels horizontally, which exceeds 4,800 pixels, the maximum printable pixel number in the vertical direction. In this case, the resize flag is set to ON ("1") and the reduction ratio is set to "3/4" ($=4,800/6,400$). Thus, the size of the image data after image rotation and resizing in this way becomes 4,800 pixels vertically and 3,600 pixels horizontally. Accordingly, the image data can be contained within the maximum printable pixel number.

As is described above, according to the second embodiment, in the case where the size of the image data exceeds the maximum printable pixel number of the PD printer 1000 due to the rotation of the image data, the image data can be supplied to the PD printer 1000 by reducing the size of the image data after the rotation so as to be contained within the maximum printable pixel number. Thus, because it is always possible to create and supply the image data for printing which matches the printing condition of the PD printer 1000, the load of the processing on the PD printer 1000 can be alleviated and a high speed and high quality printing is achieved.

Next, a third embodiment of the present invention is explained. In the third embodiment, printing is operated by obtaining the maximum printable pixel number from the PD printer 1000. A hardware configuration of the DSC 3012 and the PD printer 1000 according to the third embodiment is the same as the first embodiment, and accordingly, the explanation thereof is omitted. In addition, the processing of printing according to the third embodiment, which is carried out by communicating between the DSC 3012 and the PD printer 1000 and by supplying the image data from the DSC 3012 to the PD printer 1000, is the same as the first embodiment, and accordingly, the explanation thereof is omitted. Further, because the creation processing of the image file in the DSC 3012 according to the third embodiment is the same as the first embodiment described above, the explanation thereof is omitted.

Figure 18:
FIG. 18 is a view showing one example of a schema showing the Capability information transmitted from the PD printer to the DSC, which is a characteristic feature of a third embodiment.

FIG. 18 is a view showing one example of the schema indicating the Capability information transmitted from the PD printer 1000 to the DSC 3012 which is a feature of the third embodiment. In the schema, in row 702, the maximum printable image size (maxSupportSizes) of the PD printer 1000 is described.

<maxSupportSizes> FBAA12C0 FBAB19CB expresses information on the maximum image size.

The DSC 3012, which receives the schema, recognizes that the information included in row 702 of the <maxSupportSizes> expresses the maximum image size printable by the PD printer 1000, in accordance with arrangements made between the PD printer 1000 and the DSC 3012 in advance. In each of the two strings of eight characters in row 702, the upper four characters indicate the direction of the image (vertical or horizontal), and the lower four characters indicate an actual print size in hexadecimal number system. "FBAA" of the upper four characters indicates the horizontal direction, and "FBAB" indicates the vertical direction. In addition, "19CB" of the lower four characters in the vertical direction is equivalent to a decimal number of "6400", while "12C0" of the lower four characters in the horizontal direction is equivalent to a decimal number of "4800". Accordingly, in this case, the maximum printable pixel number of the PD printer 1000 is 6,400 pixels vertically and 4,800 pixels horizontally.

Figure 19:
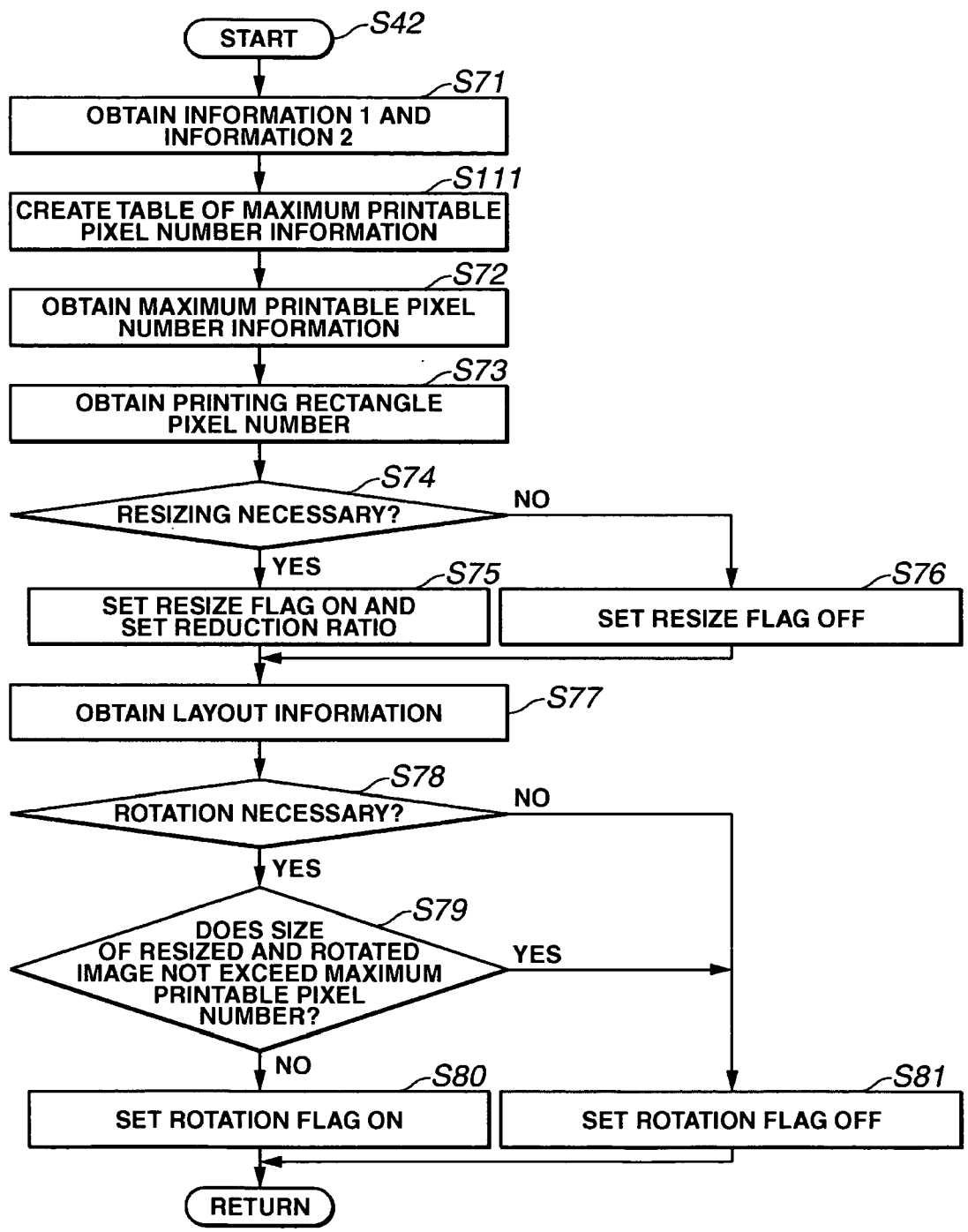
FIG. 19 is a flow chart explaining the setting of the resize flag and the rotation flag (step S42 of FIG. 9) in the DSC 3012 according to the third embodiment.

FIG. 19 is a flow chart explaining the setting of the resize flag and the rotation flag (step S42 of FIG. 9) in the DSC 3012 according to the third embodiment. In FIG. 19, the processing in common with FIG. 10 is presented with the same symbol(s) and the explanation thereof is omitted.

In step S71, the "information 1" and the "information 2", stored in the RAM 3102 of the DSC 3012 (steps S2 and S6 of FIG. 6). Here, the "information 1" is, for example, the device information as shown in FIG. 11, and includes the vendor name, the printer name, version information. In addition, the "information 2", for example, is the information that is set by the user, as shown in FIG. 12. The "information 2" includes the information on the paper sheet size, the paper sheet type, the layout, the information whether the image is bordered or borderless, and the like. In addition, in either of the "information 1" or the "information 2", the maximum printable pixel number obtained from the Capability information mentioned above is included.

Next, in step S111, the table which stores the maximum printable pixel number is created. This table is, for example, the same as the table that stores the maximum printable pixel number described above as shown in FIG. 13. Here, elements constituting the table are the maximum printable pixel number obtained from the Capability information mentioned above. In addition, the created table is stored in the RAM 3102 of the DSC 3012. The other processes are the same as those as shown in the flowchart of FIG. 10 of the first embodiment, and accordingly, the explanation thereof is omitted.

As explained above, according to the third embodiment, the DSC 3012 is capable of determining whether it is necessary to resize and rotate the image data, by obtaining the printable pixel number from the PD printer 1000.

In addition, if the printable pixel number cannot be obtained from the PD printer 1000, the printing can be carried out in the same way as in the first embodiment, based on the information stored in the DSC 3012 in advance.

Further, the printing rectangle information and the layout information may be included in the Capability information. The DSC 3012 may perform the determination based on the Capability information from the PD printer 1000, instead of storing in advance the information therein.

As discussed above, according to the third embodiment, in a case where the PD printer 1000 has not stored printing characteristics, and the printing function information is connected to the DSC 3012, it is possible to carry out the image processing suitable to the PD printer 1000 by determining whether the resizing and the rotation of the image data to be outputted to the PD printer 1000 is necessary using the Capability information provided by the PD printer 1000. In addition, because the image data thus processed is transmitted to the PD printer 1000 for printing, it becomes possible to alleviate the load of the processing on the PD printer 1000 and to carry out the printing at a high speed.

Other Embodiments

The aspect of the present invention can also be achieved by providing the system or the device with a storage medium which records a program code of software implementing the function of the embodiment and by reading and executing the program code stored in the storage medium with a computer of the system or the device (the CPU or the MPU). In this case, the program code itself, which is read from the storage medium, implements the function of the embodiment mentioned above, and accordingly, the storage medium storing the program code constitutes the present invention. As the storage medium for supplying such program code, a floppy disk, a hard disk, an optical disk, a magneto-optical disk, a CD-ROM, a CD-R, a magnetic tape, a nonvolatile memory card, a ROM, and the like can be used.

In addition, the function according to the embodiments described above is implemented not only by executing the program code read by the computer, but also implemented by the processing in which an OS (operating system) or the like carries out a part of or the whole of the actual processing on the basis of the instruction given by the program code.

Further, in another aspect of the embodiment of the present invention, after the program code read from the storage medium is written in a function enhancing board inserted in the computer or a memory which is provided in a function enhancing unit connected to the computer, the CPU and the like provided in the function enhancing board or the function enhancing unit carries out a part of or the whole of the processing to implement the function of the embodiment as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2004-267513 filed Sep. 14, 2004, which is hereby incorporated by reference herein in its entirety.

What is claimed is:

1. An image supply device for supplying image data to a printing device by directly communicating with the printing device, the image supply device comprising:

a communication unit configured to communicate with the printing device with predetermined communication protocol;

an obtaining unit configured to obtain version information related to version of the communication protocol starting communication by the communication unit;

a display unit configured to display a print setting screen;

a determining unit configured to determine whether the image data should be rotated, based on the version of the communication protocol obtained by the obtaining unit and the printing specification set by the print setting screen;

a conversion unit configured to rotate image data of an image file to be printed, in a case that the image data is determined to be rotated by the determining unit;

a transmission unit configured to transmit the image data rotated by the conversion unit to the printing device in accordance with a data request from the printing device; and a job transmission unit configured to transmit, to the printing device, a print job including information which specifies an image to be printed, wherein, in accordance with the data request based on the print job, the transmission unit does not transmit the requested image data but transmits the image data rotated by the conversion unit.

2. An image supply device according to claim 1, further comprising:

a storing unit configured to store the maximum pixel numbers of the image data which is storable by the printing device for each version of communication protocol; and a second determining unit configured to determine whether the image data should be rotated based on the maximum pixel numbers corresponding to the version of the communication protocol obtained by the obtaining unit and the printing specification set by the print setting screen.

3. An image supply device according to claim 2, wherein the storing unit stores a list of the maximum pixel numbers for each version of the communication protocol of a plurality of printing devices, wherein the obtaining unit obtains model information of a printing device with which the communication unit communicates, and wherein the determining unit determines whether to rotate an image based on the model information obtained by the obtaining unit and the maximum pixel number corresponding to the version of the communication protocol.

4. An image supply device according to claim 1, wherein the determining unit determines whether the image data should be rotated based on the version of the communication protocol and print specification set by the print setting screen.

5. An image supply device according to claim 4, wherein the print specification includes layout setting.

6. A method of controlling an image supply device comprising a communication unit configured to communicate with a printing device with predetermined communication protocol, the method comprising:

obtaining version information related to version of the communication protocol which is used for communication between the image supply device and the printing device, upon starting communication by the communication unit;

determining whether the image data should be rotated, based on the version of the communication protocol obtained using a determining unit;

rotating image data of an image file to be printed using a conversion unit, in a case that the image data is determined to be rotated;

transmitting the image data rotated to the printing device in accordance with a data request from the printing device; and transmitting to the printing device a print job including information which specifies an image to be printed, wherein, in accordance with the data request based on the print job, the transmission unit does not transmit the requested image data but transmits the image data rotated by the conversion unit.

7. A non-transitory computer-readable storage medium for storing a program configured to be executed by a computer to implement a method of controlling an image supply device comprising a communication unit configured to communicate with a printing device with predetermined communication protocol, the method comprising:

obtaining version information related to version of the communication protocol which is used for communication between the image supply device and the printing device, upon starting communication by the communication unit;

determining whether the image data should be rotated, based on the version of the communication protocol obtained using a determining unit;

rotating image data of an image file to be printed using a conversion unit, in a case that the image data is determined to be rotated;

transmitting the image data rotated to the printing device in accordance with a data request from the printing device; and transmitting to the printing device a print job including information which specifies an image to be printed, wherein, in accordance with the data request based on the print job, the transmission unit does not transmit the requested image data but transmits the image data rotated by the conversion unit.

* * * * *